Feb. 6, 1962 G. F. SCHENK 3,019,699
INSTRUMENT FOR EXAMINATION OF THE EYE
Filed April 25, 1960 2 Sheets-Sheet 1
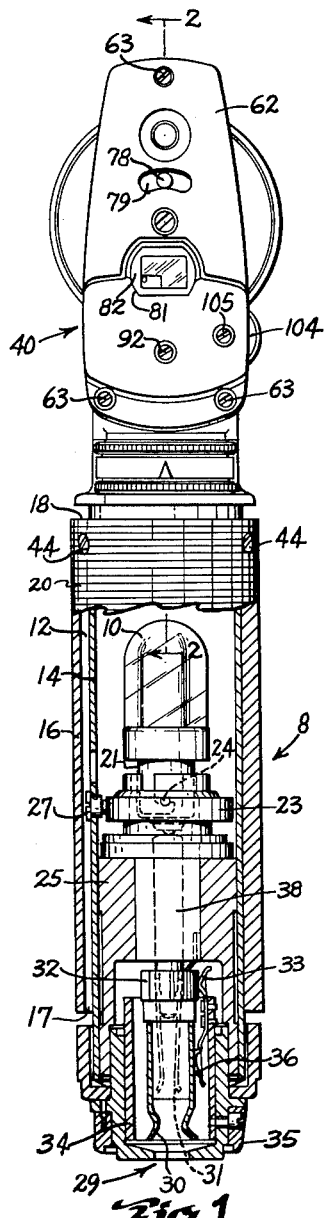
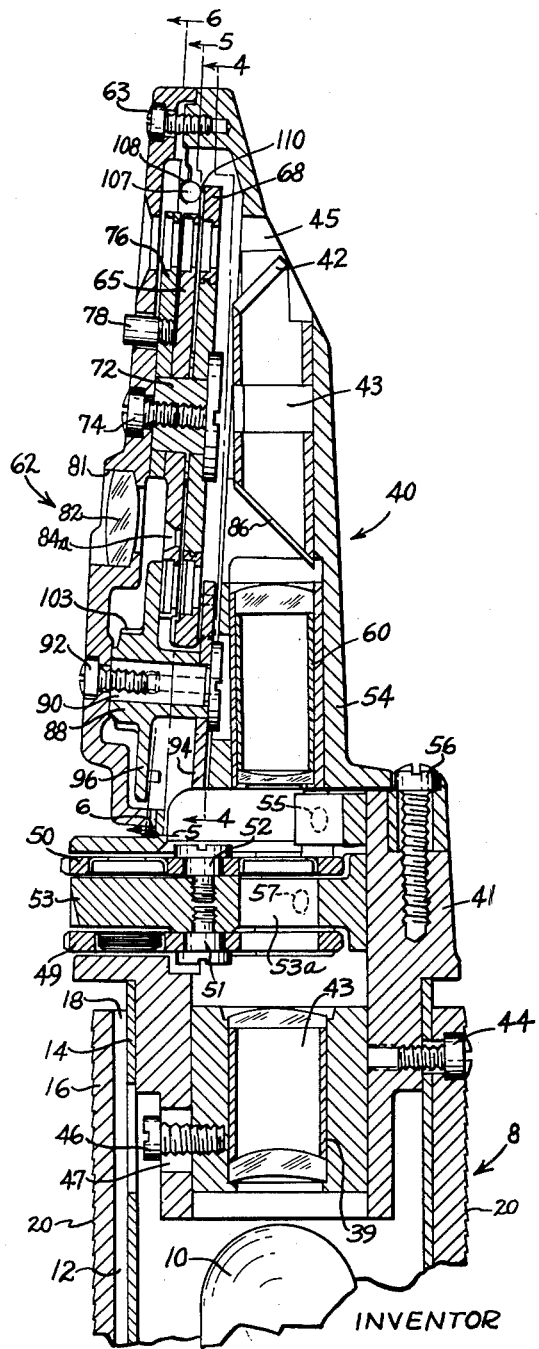
INVENTOR
GEORGE F. SCHENK
BY
Herbert C. Kimball
ATTORNEY Feb. 6, 1962  G. F. SCHENK  3,019,699
INSTRUMENT FOR EXAMINATION OF THE EYE
Filed April 25, 1960  2 Sheets-Sheet 2
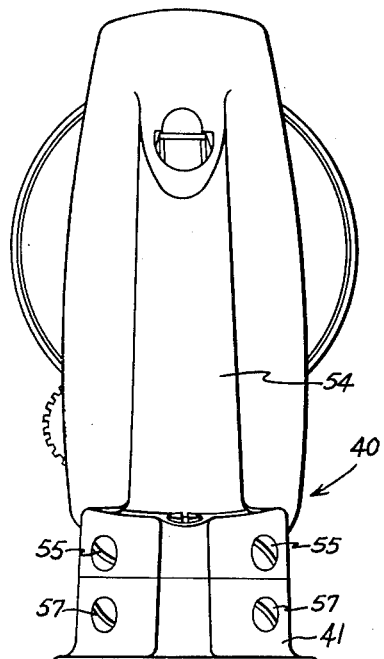
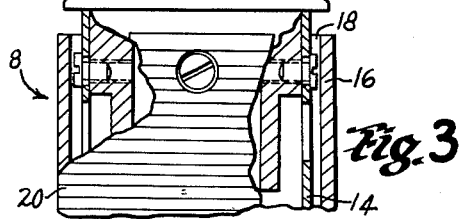
Fig. 3
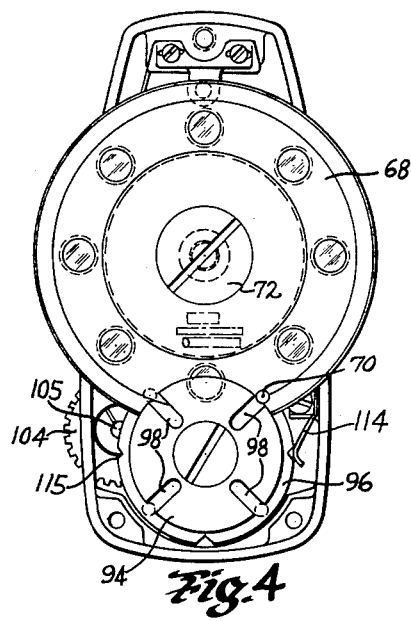
Fig. 4
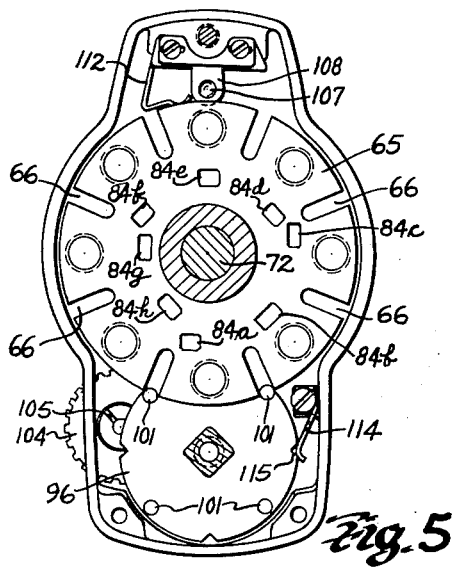
Fig. 5
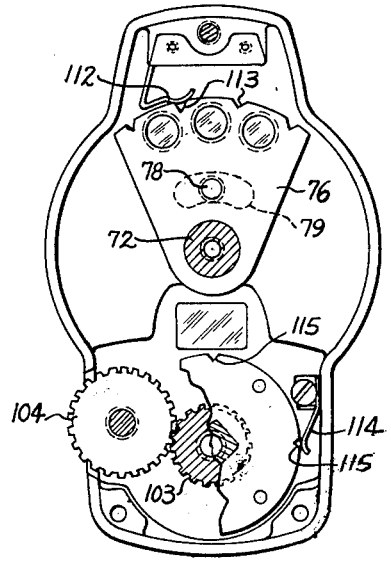
Fig. 6
INVENTOR
GEORGE F. SCHENK
BY
Herbert C. Kimball
ATTORNEY

United States Patent Office 3,019,699
Patented Feb. 6, 1962

3,019,699
INSTRUMENT FOR EXAMINATION OF THE EYE
George F. Schenk, Williamsville, N.Y., assignor to American Optical Company, Southbridge, Mass., a voluntary association of Massachusetts
Filed Apr. 25, 1960, Ser. No. 24,613
5 Claims. (Cl. 88—20)

This invention relates to a type of diagnostic instrument, such as an opthalmoscope, which directs a beam of light (which may or may not be filtered) into the eye of a patient, and permits the user to view and study the various parts of the interior of the eye and more particularly of the retina. For such examination of the interior of the patient's eye a wide range of focal powers are required by the examiner so as to bring the particular area being studied into sharp focus. The housing for the lens combinations for this purpose affords a minimum of space for even the two disc-shaped carriers for the lenses. Working within this cramped space, the present invention provides convenient control mechanism of the Geneva type for bringing into alignment with the sight opening a selected combination of two lenses, one being carried by each of the discs, which mechanism has the important advantage that although one disc is automatically advanced by one lens space each time the other disc completes one entire rotation, nevertheless it is not necessary to await such tedious step-by-step pick-up for a setting, but on the contrary a rapid rotation is made possible if such is the desire of the operator.

The need for compactness arises out of the use to which the instrument is put. The examiner must bring his own eye as close as practicable to the patient's eye to afford as wide a viewing angle through the pupil as possible, and at the same time bring the retina, and the interior generally into focus. The light for illuminating the interior of the eye must be directed into the eye, customarily by a mirror arranged at approximately an angle of 45° to the line of sight, so that this mirror is a further cause for holding the space alotted to the two lens carriers to a minimum.

The need for control of the lenses and filters of the instrument by the thumb and forefinger of one hand arises from the awkwardness inherent in changing the position of the examiner's grip once he has brought the interior of the patient's eye under observation. He wants to hold that position and still manipulate the controls for the movement of the two lens carriers and for the insertion of the accessories such as filters and polarizers, without loosing his grip on the instrument handle. This limits the convenient control under viewing conditions to the thumb and forefinger of one hand. The drive for the lenses and the arrangement for flipping in the desired filter are, in accordance with the present invention, positioned right where the examiner's thumb and forefinger may control them.

In the accompanying drawings which set forth in detail one form which the present invention may assume:

FIG. 1 is a view in elevation, looking from the examiner's side, of an ophthalmoscope embodying the present invention, the handle portion being shown in central vertical cross section;

FIG. 2 is a view in vertical section of the portion of the ophthalmoscope not shown in section in FIG. 1, this section being taken on the line 2—2 in FIG. 1;

FIG. 3 is a view in elevation, looking from the patient's side, of the portion of the ophthalmoscope shown in FIG. 2, the handle portion being broken away to reveal details of construction, and FIGS. 4, 5 and 6 are sectional views taken respectively on the lines 4—4, 5—5 and 6—6 in FIG. 2.

The ophthalmoscope shown in the accompanying drawings has a handle 8 of double-wall construction for the greater comfort of the user of the instrument. The electric lamp 10, which is unusually powerful for instruments of this character, is housed in the handle, and air passages 12 between the inner wall 14 and the outer wall 16 are in communication with the outside air both at the bottom 17 and at the top 18. Convection currents are accordingly generated to carry away the heat from the lamp 10 which otherwise would gradually raise the temperature of the gripping portion of the handle 8 and render it uncomfortably warm. As shown in FIGS. 2 and 3, the outside of the wall 16 is given a sawtooth configuration 20 to facilitate gripping by the hand of the user.

The base 21 of the lamp is received in a bayonet type socket 23 having the customary upward spring pressure to hold the pair of opposite pins 24 in their recesses. The socket 23 is fastened securely to the body member 25 of the handle by screws (not shown) which are passed through enlarged openings in the base of the socket 23. Such enlarged openings permit lateral shifting of the socket 23 in the well known manner under the action of three adjustment screws, of which one is shown at 27, spaced 120° apart around the inner wall 14 of the handle. After the lamp 10 has been accurately adjusted by the screws 27 into alignment with the axis of the optical system which projects light into the eye of the patient, the socket 23 is secured in fixed relation to the body member 25.

The bottom of the handle 8 is open at 29 to receive an electrical jack coacting with the contacts 30 and 31 to supply current to the lamp 10 at a controlled rate. For purposes of such control a rheostate 32 whose moveable contact is indicated by the numeral 33 is housed in the lower portion of the handle 8. This contact 33 is carried by an internal sleeve 34 forming a part of a knurled rotable control knob 35, which functions to place in circuit with the contact 30 a selected portion of the resistance of the rheostat. A lower extension 36 of the contact 33 is at all times in engagement with the contact 30. A central plug 38 connected to contact 31 extends upwardly and is spring pressed against the central lead in the base 21 of the lamp 10. The circuit is completed from the annular lead of the base 21 through the socket 23 and the body member 25 to the rheostat 32.

The optical system above mentioned is designed to image the filament of the lamp 10 somewhat beyond the 45° mirror 42, which as above referred to directs illumination into the eye of the patient. A condenser 39 (see FIG. 2) is carried by a sleeve member 41 of the head 40 of the ophthalmoscope. A light channel 43 extends through the head 40 to the mirror 42. As is customary, the sight opening or viewing aperture 45 used by the examiner is immediately above the mirror 42. A plurality of screws 44 secure the sleeve member 41 in place in the handle 8 after proper adjustment of the condenser 39 has been made for focusing the image of the lamp filament on the mirror 42. Such adjustment of the condenser 39 toward and away from the lamp filament along the light channel 43 is effected by loosening the adjustment screw 46, this screw being received in a slot 47 in the member 41 for this purpose. When the proper focus has been attained, the screw 46 is tightened.

Two discs 49 and 50 are rotatably mounted on a common vertical axis, this axis being offset laterally so that filters and the like carried by the discs may be swung into and out of the light channel 43. The discs 49 and 50 are carried by studs 51 and 52 respectively threaded into the bottom and top of a bracket member 53 secured within the sleeve member 41 by screws 57 (see FIG. 3). An opening 53a through the bracket member continues the light channel 43 through this member. Disc 49 carries a selection of filters and a blank aperture. As shown, there are three filters which by way of example may be a red-free filter, a yellow filter and a light polarizer. Disc 50 is provided with a selection of apertures, for instance, a graded series of small, medium and large round apertures together with a slit. The rims of these discs 49 and 50 are preferably knurled, and a portion of each rim is exposed where it can be manipulated by the thumb or forefinger of the examiner (compare FIGS. 1 and 2).

A tubular member 54 forming part of the head 40 is secured to the sleeve member 41 by a pair of screws 55 (see FIG. 3) and by a screw 56 (see FIG. 2). The light channel 43 continues through this tubular member 54 to the front surface mirror 42. An objective 60 in the tubular member 54 forms the second part of the above-mentioned optical system, the objective 60 cooperating with the condenser 39 to bring the filament of lamp 10 to a focus adjacent the mirror 42 as above set forth.

The member 54 supports a cover member or lens casing 62. By removing the securing screws 63, the cover member 62 may be detached and with it the two sets of test lenses, these being carried by dials rotatably mounted in the cover member 62. The set of test lenses nearer the eye of the examiner are relatively stronger than the second set (nearer the mirror 42). In the illustrative embodiment shown in the present application the stronger set of test lenses (see FIG. 5) includes five negative lenses, two positive lenses and one clear aperture, and the dial 65 in which these lenses are mounted has a radial slot 66 between each pair of adjacent lenses for purposes of the Geneva movement later to be described. The weaker set (see FIG. 4) in this embodiment includes seven graded positive lenses, for instance, in one diopter steps from one diopter to seven diopters, together with one clear aperture. The dial 68 in which these lenses are mounted carries adjacent its periphery a pin 70 which projects on the side toward the mirror 42. The two dials 65 and 68 are journaled on a flanged hub 72 which is secured to the cover member 62 by a screw 74. This same hub 72 has sufficient depth to provide a journal also for a segment 76 which is disposed on the side toward the eye of the examiner (see FIG. 2), and is provided with a pin 78 projecting through an arcuate slot 79 in the cover member 62, so as to afford limited oscillation of the segment 76 as actuated through the pin 78 by the examiner's finger. This segment may carry, in addition to a clear aperture, such auxiliary elements as a polarizing filter and a lens calculated in accordance with the personal prescriptive requirements of the user of the instrument or a lens to extend the lens range in dials.

The cover member 62 has an opening 81 which carries a magnifying lens 82. Indicia for informing the examiner which combination of lenses is in operative position before his eye are brought into registering position behind the magnifying lens 82 as the dials 65 and 68 are rotated to obtain the desired combination of lenses. The dial 65 has a window 84a, 84b, 84c, 84d, 84e, 84f, 84g and 84h cut through it (as shown in FIG. 2) for each lens or clear aperture, the material of the dial 65 being sufficiently opaque to obscure all indicia on the dial 68 except the one which registers with the window behind the lens 82. In FIG. 5, dial 65 is shown with the clear aperture in operative position and the window 84a, which is approximately diametrically opposite, is slightly offset so as to register with the series of indicia on the dial 68 for the powers from 0 to 7 diopters. The window 84b (diametrically opposite a lens of +8 diopters power) is centered so as to register with a second series of indicia on the dial 68 for the powers 8 to 15 diopters. The window 84c (approximately diametrically opposite a lens of +16 diopters power) is offset in the opposite direction from the window 84a, and registers with a third series of indicia on the dial 68 for the powers 16 to 23 diopters. The window 84d (approximately daimetrically opposite a lens of −40 diopters power) is at a slightly smaller radial distance from the hub 72 and is slightly offset in the same direction as window 84a. Window 84d registers with a fourth series of indicia on the dial 68 for the powers −33 to −40 diopters. The window 84e (diametrically opposite a lens of −32 diopters power) is centered so as to register with a fifths series of indicia on the dial 68 for the powers −25 to −32 diopters. The window 84f (approximately opposite a lens of −24 diopters power) is slightly offset in the opposite direction from window 84d so as to register with a sixth series of indicia on the dial 68 for the powers −17 to −24 diopters. Both windows 84e and 84f are at the same radial distance from the hub 72 as window 84d. The remaining two windows 84g and 84h are at a slightly smaller radial distance from the hub 72 than window 84d. Both are slightly offset but in opposite directions. Accordingly, window 84g (approximately opposite a lens of −16 diopters power) registers with a seventh series of indicia on the dial 68 for the powers −9 to −16 diopters; and the window 84h (approximately opposite a lens of −8 diopters power) registers with an eighth series of indicia on the dial 68 for the powers −1 to −8 diopters.

The result of this arrangement of windows and indicia is that in one of eight locations in the opening 81 behind the magnifying lens 82, there appears automatically the correct power for the combinations of lenses, or lens and clear aperture, which is in operative position in front of the examiner's eye. All minus powers are in red. All plus powers are in black. Diametrically opposite each lens, or the aperture, on dial 68 appears a cluster of eight indicia (black for positive, red for negative), one from each series. Only one of the cluster will be visible at a time in opening 81 due to the arrangement of the eight windows 84a, etc.

The material of the dial 68 is sufficiently translucent to pass light supplied from the rear by a clear glass plate 86 set at 45 degrees to the longitudinal axis of the light channel 43. When the glass plate 86 is set at this angle, there is sufficient reflection from its lower surface to illuminate the portion of the dial 68 carrying the above described indicia on its front face. There is ample space between the objective 60 and the lower end of light channel 43, where the glass plate 86 is mounted, to transmit the light reflected by plate 86 to the dial 68.

Passing reference has been made in the preceding description to the Geneva movement which connects the dials 65 and 68; and the pin 70 which projects from the dial 68 has been mentioned, as well as the radial slots 66 in the dial 65. The Geneva movement includes, in addition, a rotatable impeller 88 mounted on a hub 90 secured by a screw 92 to the lens casing 62. The impeller 88 has two radial flanges 94 and 96 which are sufficiently spaced to receive between them the peripheral portions of the dials 65 and 68 (see FIG. 2). As will be seen in FIG. 4, the flange 94 has radial slots 98 which are spaced apart a distance to correspond accurately to the distance advanced by pin 70 when moving one-eighth of a complete rotation of the dial 68. Moreover, the inlets to the slots are aligned with the orbital path of the pin 70. During seven-eighths of the orbital movement of pin 70, the flange 94 is not driven, but during the other one-eighth of this orbital movement, the pin 70 is engaged in a slot 98 and accordingly the impeller 88 is driven. At the end of this one-eighth rotation of dial 68, the pin 70 becomes disengaged from the slot 98. The impeller 88 has meantime been driven one-quarter of a turn. The other flange 96 of the impeller is provided with four pins 101 which, together with the slots 66, form a pin gear for driving the dial 65. Accordingly, during seven-eighths of the orbital movement of pin 70, the dial 65 is not driven, but during the other one-eighth of this orbital movement (while the pin 70 is engaged in a slot 98) the dial 65 is advanced one-eighth of a turn, or in other words, the space between the centers of two adjacent lenses.

A spur gear is integrally formed at 103 in the hub of impeller 88. With this gear 103 meshes a spur gear 104, mounted by a stud 105 on the lens casing 62 so that a portion projects through the side of the lens casing 62. The dial 68 has a larger diameter than the dial 65, as is apparent from FIG. 2, and the lens casing 62 permits the rim to project on the two sides of the casing. This projecting rim of the dial 68 is knurled for facilitating turning by the finger of the examiner.

A ball 107 biased by a spring 108 is arranged to act as a detent by dropping into a depression 110 formed in alignment with each lens (or aperture) adjacent the periphery of the dial 68. Accordingly, the examiner detects, by the dropping of the detent ball 107 into a depression 110, that a lens in the dial 68 is accurately in registry with the sight opening of the instrument. A detent spring 112 cooperates with notches 113 (see FIG. 6) in the arcuate end surface of the segment 76 to align the aperture, filter or lens in the segment with the sight opening. A detent spring 114 cooperates with notches 115 in the periphery of the flange 96 of the impeller 88, and in this way tends to hold the impeller stationary, restraining the dial 65 in position with a lens aligned with the sight opening. From FIG. 5 it will be observed that the pins 101 function as pin gearing in mesh with the slots 66 in the dial 65. On the other hand, due to the fact that the flange 94 is of smaller diameter than the flange 96, the pin 70 meshes with a slot 98 only after the detent ball 107 has yielded and the movement to the next lens position has started. Therefore, with the dial 68 in inactive position, the pin 70 (see FIG. 4) does not interfere with rotation of dial 65 by the spur gear 104.

An instrument embodying the features which I have described is remarkably compact for the number of lens combinations which are made available. At the same time, all changes in the setting of the lens dials can be brought about with the index finger of the examiner without ceasing to observe the interior of the patient's eye. This finger reaches the knurled edge of the dial 68, and also the exposed portion of the spur gear 104. The dial 68 can thus be turned directly, and if the rotation of this dial is carried far enough, the Geneva mechanism including the impeller 88 causes the next lens of the strong dial 65 to be swung automatically into place. If, on the other hand, the user decides to make use of a more remote lens, such as a negative lens, or dial 65, he needs merely to rotate the spur gear 104 with his index finger to arrive quickly at the desired lens.

Other features, such as the ready identification of the total accumulated dioptric power before the eye of the user, due to illumination reaching the back of the weak dial 68 by specular light from the plate 86, have been referred to in the course of the description of the invention. It should be noted that the specular light from such a clear glass plate amounts to only about four percent of the beam of light passing along the light channel 43, and, therefore, yields a much softer illumination of the indicia than is the case where direct light is passed from the lamp 10 to the indicia. Moreover, soft ilumination of this character is desirable because of the selective showing of one numeral from a cluster through the window 84a, b, c, etc. With excessive illumination, the blocking out of unwanted numerals would not be so successful.

All of these features are conducive to accuracy in use of the instrument. Moreover, the ability to control the lens combination aligned with the sight opening 45, and even the filters and apertures in the discs 49 and 50, without releasing the grip on the handle 3 adds greatly to the usefulness of the instrument.

I claim:

1. In a device for eye examination having a housing with a transverse viewing aperture, a lamp in said housing, an optical system for directing a beam of light along a light channel in said housing and light directing means immediately adjacent said viewing aperture for directing said beam of light into an eye under examination, the combination of a pair of coaxial lens dials carrying each a graded series of lenses, one series being of relatively weak dioptric power and the other series being of relatively strong dioptric power, means for rotatably supporting said coaxial dials side by side in said housing with said weak dial more remote from the examiner's eye than said strong dial, and means having a Geneva pick-up connecting said dials for rotating said dials and thereby selecting the combination of strong and weak lenses positioned in said viewing aperture characterized by a rotatable impeller having two radial flanges overlapping and receiving between them peripheral portions of said pair of dials, said Geneva pick-up connection driving said impeller from said weak dial, and pin gearing connecting said impeller in driving relation wth said strong dial.

2. In a device for eye examination, the combination with means for directing a beam of light into an eye under examination, of a pair of coaxial rotatable lens dials carrying each a series of lenses for cooperating with the eye of the examiner, a lens casing for housing said dials and having a viewing aperture substantially aligned with the beam of light directed into the eye under examination, and means for rotating said dials and positioning a selected combination of lenses from said two dials in aligned relation with said viewing aperture characterized by a rotatable impeller driven by one of said dials and having two radial flanges overlapping and receiving between them peripheral portions of said pair of dials, the dial driving said impeller having a laterally projecting pin cooperating with slots in the impeller flange overlapping said dial to provide a Geneva movement for a single step advance of the impeller with each rotation of said dial, the other of said impeller flanges having laterally projecting pins cooperating with slots in the other dial to provide pin gearing for driving the last mentioned dial.

3. In a device for eye examination, the combination with means for directing a beam of light into an eye under examination, of a pair of coaxial rotatable lens dials carrying each a series of lenses for cooperating with the eye of the examiner, a lens casing for housing said dials and having a viewing aperture substantially aligned with the beam of light directed into the eye under examination, means for yieldably detaining a lens of one of said dials in alignment with a lens of the other of said dials and with said viewing aperture and means for rotating said dials and thereby selecting the combination of lenses aligned with said viewing aperture comprising a rotatable impeller driven by one of said dials and having two radial flanges overlapping and receiving between them peripheral portions of said pair of dials, the dial driving said impeller having its periphery exposed at one side at least of said casing for engagement by the operator and having a laterally projecting pin cooperating with slots in the impeller flange overlapping said dial to provide a Geneva movement for a single step advance of the impeller with each rotation of said dial, the other of said impeller flanges having laterally projecting pins cooperating with slots in the other dial to provide pin gearing for driving the last mentioned dial, and a spur gear meshing with gear teeth on said impeller and projecting from said lens casing for selective setting of said last mentioned dial.

4. In a device for eye examination, the combination with a housing having a viewing aperture, a lamp within said housing, and means adjacent said viewing aperture for directing a beam of light from said lamp into an eye under examination, of a pair of coaxial lens dials carrying each a graded series of lenses, one series being of relatively weak dioptric power and the other series being of relatively strong dioptric power, means for rotatably supporting said pair of dials side by side in position in said housing to position a selected combination of a lens of one series and a lens of the other series closely adjacent each other in said viewing aperture, the periphery of said weak dial being exposed at one side at least of said housing for engagement by the operator, and means having a Geneva pick-up connecting said dials for rotating said strong dial and thereby positioning a selected combination of strong and weak lenses in said viewing aperture comprising a rotatable impeller having two radial flanges overlapping and receiving between them peripheral portions of said pair of dials, said Geneva pick-up connection including a laterally projecting pin on said weak dial cooperating with slots in the impeller flange overlapping said weak dial to drive said impeller, the other of said impeller flanges having laterally projecting pins cooperating with slots in said strong dial to provide pin gearing for driving said strong dial, and a gear meshing with gear teeth on said impeller for selectively setting said strong dial, a portion of said meshing gear projecting from said housing to permit digital rotation thereof.

5. In a device for eye examination having a housing with a transverse viewing apertures, a lamp in said housing, an optical system for directing a beam of light along a light channel in said housing and a mirror immediately adjacent said viewing aperture for directing said beam of light into an eye under examination, the combination of a pair of coaxial lens dials carrying each a graded series of lenses, one series being of relatively weak dioptric power and the other series being of relatively strong dioptric power, means for rotatably supporting said dials side by side in said housing with said weak dial more remote from the examiner's eye than said strong dial, said weak dial having a cluster of power indicia in predetermined relation to each of said weak lenses, said strong dial having a window in predetermined relation to each of said strong lenses for selectively revealing a single indicium from each cluster, said housing having an opening cooperating therewith, a plate of clear glass interposed at an angle in said light channel for illuminating by specular light the surface of said weak dial opposite the surface carrying the cluster registering with the opening in said housing, and means having a Geneva pick-up connecting said dials for rotating said dials and thereby selecting the combination of strong and weak lenses positioned in said viewing aperture comprising a rotatable impeller having two radial flanges overlapping and receiving between them peripheral portions of said pair of dials, said Geneva pick-up connection driving said impeller from said weak dial, and pin gearing connecting said impeller in driving relation with said strong dial.

References Cited in the file of this patent
UNITED STATES PATENTS

| | | |
|---|---|---|
| 1,596,717 | Clement et al. | Apr. 17, 1926 |
| 1,804,691 | Hunsicker | May 12, 1931 |
| 2,785,598 | Kirchhubel | Mar. 19, 1957 |